United States Patent
Goodman et al.

(10) Patent No.: US 6,943,976 B2
(45) Date of Patent: Sep. 13, 2005

(54) REZEROING A ROBOT ACCESSOR OF AN AUTOMATED DATA STORAGE LIBRARY

(75) Inventors: Brian Gerard Goodman, Tucson, AZ (US); Aaron Lyle Herring, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 10/668,695

(22) Filed: Sep. 23, 2003

(65) Prior Publication Data

US 2005/0073767 A1 Apr. 7, 2005

(51) Int. Cl.[7] .............................................. G11B 15/68
(52) U.S. Cl. ...................... 360/69; 369/30.31; 414/273; 700/254
(58) Field of Search .............................. 360/71, 69, 92; 369/30.31, 30.43, 30.45, 30.55, 30.57; 414/273, 275; 700/218, 254

(56) References Cited

U.S. PATENT DOCUMENTS

| | | | |
|---|---|---|---|
| 5,426,581 A | 6/1995 | Kishi et al. ............ 364/167.01 |
| 5,457,773 A | 10/1995 | Jeon | |
| 5,703,843 A | * 12/1997 | Katsuyama et al. ...... 369/30.33 |
| 5,872,751 A | * 2/1999 | Utsumi et al. ........... 369/30.29 |
| 5,946,160 A | 8/1999 | Ohashi ........................ 360/92 |
| 5,959,866 A | 9/1999 | Hanaoka et al. ....... 364/478.02 |
| 5,963,514 A | * 10/1999 | Kanetsuku et al. ...... 369/30.34 |
| 5,967,339 A | 10/1999 | Utsumi et al. ........... 211/41.12 |
| 6,005,734 A | 12/1999 | Shimada et al. .............. 360/69 |
| 6,115,648 A | 9/2000 | Gallo ........................ 700/218 |
| 6,205,093 B1 | * 3/2001 | Abbott et al. ............ 369/30.31 |
| 6,278,905 B1 | 8/2001 | Saito | |
| 6,463,353 B1 | 10/2002 | Hashimoto | |
| 6,483,655 B1 | 11/2002 | Ojima ........................ 360/69 |
| 6,493,607 B1 | 12/2002 | Bourne et al. | |

OTHER PUBLICATIONS

"Automated Mastering Procedure", IBM Technical Disclosure Bulletin, May 1994, pp 205–206.

* cited by examiner

Primary Examiner—David Hudspeth
Assistant Examiner—James L Habermehl
(74) Attorney, Agent, or Firm—John H. Holcombe

(57) ABSTRACT

The positioning of a robot accessor in an automated data storage library is rezeroed with respect to a home position which potentially avoids moving the robot accessor to the home position in every rezero operation. The robot accessor is moved to the expected location of a reference point in the library. If the reference point is sensed by a robot accessor sensor at substantially the expected location, the rezero operation is completed; else, the rezero operation is continued. Alternatively, if there is an offset between the sensed location of the reference point and the expected location, the robot accessor is moved to a second expected location of a second reference point. If the offsets are consistent, the calibration is updated, completing the rezero operation.

12 Claims, 9 Drawing Sheets

407 →

408 →

409 →

410 →

REZEROING A ROBOT ACCESSOR OF AN AUTOMATED DATA STORAGE LIBRARY

FIELD OF THE INVENTION

This invention relates to determining positioning in an automated data storage library, and, more specifically, to rezeroing the home position of a robot accessor of the library, the robot accessor for transporting data storage media between a plurality of storage shelves and at least one data storage drive in the library.

BACKGROUND OF THE INVENTION

Automated data storage libraries provide a means for storing large quantities of data in data storage media that are not permanently mounted on data storage drives, and that are stored in a readily available form on storage shelves. One or more robot accessors retrieve selected data storage media from storage shelves and provide them to data storage drives. Typically, data stored on data storage media of an automated data storage library, once requested, is needed quickly. Positional accuracy is required so that the robot accessor is able to access a desired storage shelf or a desired data storage drive, typically by direct "X" horizontal movement and "Y" vertical movement. The X and Y positioning are typically based on a reference or origin location.

Often, a library may comprise one or more calibration points in the library, so that the robot accessor can go to the calibration point and precisely measure its location to establish the parameters, including the X and Y location, needed to correctly access the remainder of the library.

Positional errors or uncertainty may develop through a number of means. One example is a library power off. The position of the robot accessor is not be monitored during the power off, and the robot accessor may have been moved. Another example is if a door of the library is opened and the robot accessor moved. Some other causes of positional errors may comprise belt or chain slippage or stretching, motor tachometer errors, control system errors, jumping a gear, a component may become misaligned or wear, etc.

Hence, a common practice involves having a home position for the robot accessor which is used as the reference or origin location for the X and Y positioning and for other features in the library. The home position may comprise a special home station at a position of the library, for example, at one end of the rails on which the robot accessor is moved. In a loss or uncertainty of position by the robot accessor, a "rezero" operation is conducted in which the robot accessor is moved toward the home position reference location. When at the home position, a home sensor indicates the location of the robot accessor, which then becomes known, and calibration or other operations can then be conducted. If its position is lost, the robot accessor is typically moved at a slow speed toward the home position for the rezero operation, since the actual position is unknown with any certainty, and the robot accessor may instead be actually moving to a crash stop, etc., and it is desirable to avoid a collision.

As automated data storage libraries become larger, the potential distance between the home position and the robot accessor becomes longer, and this increases the time it takes to perform the rezero operation.

SUMMARY OF THE INVENTION

In accordance with the present invention, an automated data storage library, a system, a method, and computer readable program code determine positioning within the library.

The automated data storage library comprises a plurality of storage shelves for storing data storage media; at least one data storage drive for reading and/or writing data with respect to the data storage media; and at least one robot accessor for transporting the data storage media between the storage shelves and data storage drive(s). A home position is provided in the library for the robot accessor, and the robot accessor has at least one sensor.

In one embodiment of the present invention, at least one reference point is located at an expected location in the automated data storage library remote from the robot accessor home position. At least one processor operates a robot accessor in accordance with a calibration system, conducting a rezero operation. The processor(s) moves the robot accessor sensor to the expected location of the at least one reference point; and, if the one reference point is sensed by the robot accessor sensor at substantially the expected location, the rezero operation is completed.

In another embodiment, if the one reference point is sensed by the robot accessor; the processor(s) compares the sensed location of the one reference point to the expected location; if the comparison indicates that there is an offset between the sensed location and the expected location, updates the calibration system with respect to the one reference point and the rezero operation is completed.

In a further embodiment, the processor(s), if the one reference point is sensed by the robot accessor; compares the sensed location of the one reference point to the expected location; compares any offset therebetween to an offset threshold; and, if the comparison indicates that there is an offset between the sensed location and the expected location, moves the robot accessor to a second expected location of a second reference point; and if the second reference point is sensed by the robot accessor sensor at substantially the second expected location, updates the calibration system with respect to the one reference point, and the rezero operation is completed.

Still further, if the second reference point is sensed but is offset from the expected position; the processor(s) determines whether the offset of the second reference point is consistent with the offset of the one reference point; and, if the offsets are consistent, updates the calibration system with respect to the one reference point and/or the second reference point, and completes the rezero operation.

In another embodiment, at least one unique reference is provided at an unique location in the automated data storage library. The processor(s), in conducting a rezero operation, moves the robot accessor sensor(s) toward the unique location of the unique reference and/or the home position; and if the unique reference is sensed by a robot accessor sensor, determines the unique location and completes the rezero operation.

In still another embodiment, the processor(s), if the unique reference is found, moves the robot accessor to the home position at high speed.

In a further embodiment, the processor(s), additionally, if the unique reference is sensed by a robot accessor sensor, determines the unique location and moves the robot accessor sensor to the expected location of a reference point. If the reference point is sensed by a robot accessor sensor at substantially the expected location, the rezero operation is completed.

Thus, the present invention potentially avoids moving the robot accessor to the home position in every rezero operation or moves it home at a faster speed in some rezero operations.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
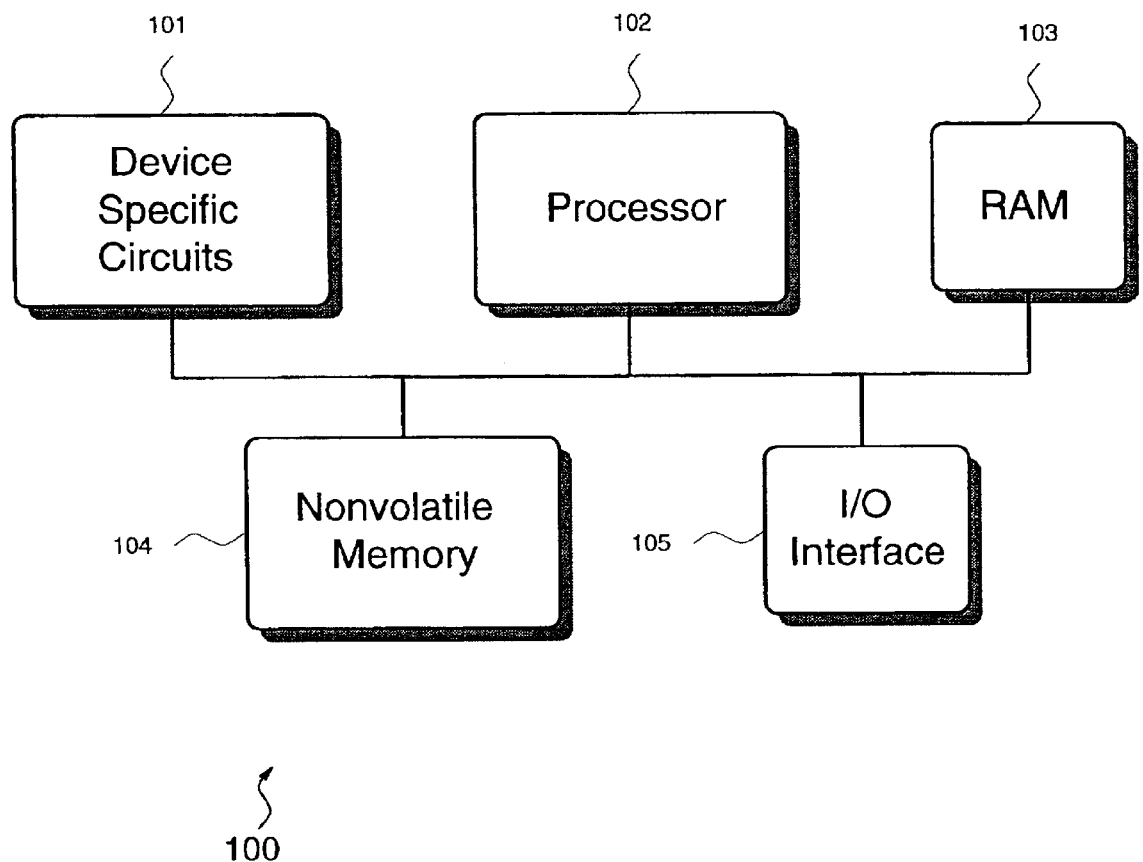
FIG. 1 is a block diagrammatic view of an example of a processor for an automated data storage library, which may implement the present invention.

An automated data storage library typically comprises one or more processors to direct the operation of the library. The processors may take many different forms and may comprise an embedded system, a distributed control system, a personal computer system, workstation, etc. FIG. 1 illustrates one example of a library processor 100 with a processor unit 102, random access memory (RAM) 103, and a nonvolatile memory 104. The processor may also be provided with an input/output (I/O) interface 105, and may employ device specific circuits 101. Alternatively, the RAM 103 and/or nonvolatile memory 104 may comprise part of the processor unit 102, as could the device specific circuits 101 and I/O interface 105. The processor unit 102 may comprise an off the shelf microprocessor, custom processor, an FPGA (Field Programmable Gate Array, an ASIC (Application Specific Integrated Circuit), discrete logic, etc. The RAM 103 is typically employed to hold variable data, executable instructions, etc. The nonvolatile memory 104 may comprise any type of nonvolatile memory, such as EEPROM (Electrically Erasable Programmable Read Only Memory), flash PROM (Programmable Read Only Memory), battery backup RAM (Random Access Memory), hard disk drive, etc. The nonvolatile memory 104 is typically employed to hold executable firmware, such as computer readable program code for implementing the present invention, and any nonvolatile data. The I/O interface 105 is a communication interface that allows the processor unit 102 to communicate with devices external to the processor 100. Examples may comprise interfaces such as USB (Universal Serial Bus), RS-232 (Recommended Standard), SCSI (Small Computer Systems Interface), Fibre Channel, etc. The device specific circuits 101 provide additional hardware for the processor 100 to perform functions such as motor control of a cartridge gripper, etc. The device specific circuits 101 may comprise electronics that provide Pulse Width Modulation (PWM) control, Analog to Digital Conversion (ADC), Digital to Analog Conversion (DAC), etc. All or part of the device specific circuits 101 may reside outside the vicinity of the processor 100.

FIGS. 2, 3, 4 and 5 illustrate an embodiment of an automated data storage library 10, in accordance with the present invention, which is arranged for accessing data storage media, typically in response to commands from at least one external host system, and comprises a plurality of storage shelves 16 for storing data storage media; at least one data storage drive 15 for reading and/or writing data with respect to the data storage media; and at least one robot accessor 18 for transporting the data storage media between the plurality of storage shelves 16 and the data storage drive(s). The library may also comprise one or more operator panels 23, 280 or other user interface, such as a web-based interface, which allows a user to interact with the library. The library 10 may comprise one or more frames 11–13, each having storage shelves 16 accessible by the robot accessor 18. The robot accessor 18 comprises a gripper assembly 20 for gripping one or more data storage media, and comprises an accessor sensor 22, such as an LED (Light Emitting Diode) emitter/detector, a bar code scanner, and/or or reading system, such as a smart card reader or similar system etc., mounted on the gripper 20, to "read" identifying information about the data storage media, and to sense information about the automated data storage library, as will be discussed.

The illustrated embodiment of a data storage library 10 employs a plurality of processor nodes, any or each of which may comprise processor 100 of FIG. 1, and which may implement the present invention. An example of a data storage library which may implement the present invention is the IBM 3584 Tape Library. The library comprises a base frame 11, may additionally comprise one or more extension frames 12, and may comprise a high availability frame 13.

The base frame 11 of the library 10 comprises one or more data storage drives 15, and a robot accessor 18. As discussed above, the robot accessor 18 comprises a gripper assembly 20 and an accessor sensor 22. The data storage drives 15, for example, may be optical disk drives or magnetic tape drives, and the data storage media may comprise optical or magnetic tape media, respectively, or any other removable media and associated drives. As examples, a data storage drive may comprise an IBM LTO Ultrium Drive, may comprise a DLT 8000 Drive, etc. Additionally, a control port may be provided, which acts to communicate between a host and the library, e.g., receiving commands from a host and forwarding the commands to the library, but which is not a data storage drive.

The extension frame 12 comprises additional storage shelves, and may comprise additional data storage drives 15. The high availability frame 13 may also comprise additional storage shelves and data storage drives 15, and comprises a second robot accessor 28, which includes a gripper assembly 30 and an accessor sensor 32 or other reading device, and an operator panel 23 or other user interface. In the event of a failure or other unavailability of the robot accessor 18, or its gripper 20, etc., the second robot accessor 28 may take over.

Each of the robot accessors 18, 28 moves its gripper in at least two directions, called the horizontal "X" direction and vertical "Y" direction, to retrieve and grip, or to deliver and release the data storage media at the storage shelves 16 and to load and unload the data storage media at the data storage drives 15.

Figure 5:
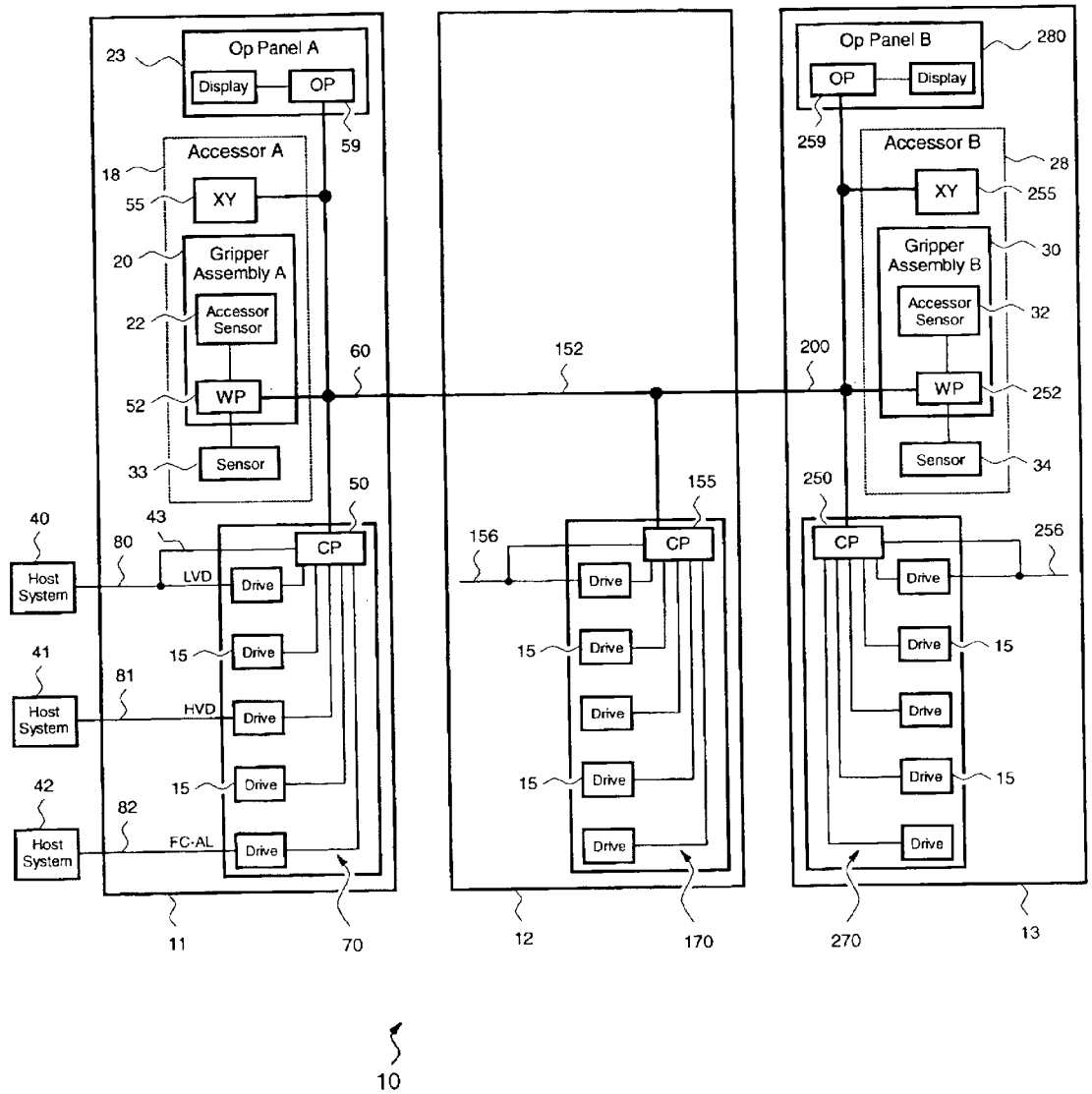
FIG. 5 is a block diagrammatic representation of an embodiment of an automated data storage library of FIGS. 2, 3 and 4, employing a plurality of processor nodes of FIG. 1.

Referring to FIG. 5, the library 10 receives commands from one or more host systems 40, 41 or 42. The host systems, such as host servers, communicate with the library directly, e.g., on path 80, 43, through one or more control ports (not shown), or through one or more data storage drives 15, providing commands to access particular data storage media and move the media, for example, between the storage shelves and the data storage drives. The commands are typically logical commands identifying the media and/or logical locations for accessing the media.

The library is controlled by one or more processors, the processors receiving the logical commands and converting the commands to physical movements of the robot accessor 18, 28. As discussed above, the processors may comprise a centralized control system, or a distributed control system of a plurality of processor nodes. In one example of a distributed control system, a communication processor node 50 may be located in the base frame 11. The communication processor node provides a communication link for receiving the host commands, either directly or from the drives 15, via at least one external interface 43. The communication processor node 50 may additionally provide a communication link 70 for operating and/or communicating with the data storage drives 15.

The communication processor node 50 may be located in the base frame 11, close to the data storage drives 15. Additionally, in an example of a distributed processor system, one or more additional work processor nodes are provided, which may comprise, e.g., a work processor node 52 that may be located at the robot accessor 18, and that is coupled to the communication processor node 50. Each work processor node may respond to received commands that are broadcast to the work processor nodes from any communication processor node, and the work processor node may also direct the operation of the robot accessor, providing move commands. An XY processor node 55 may be provided and may be located at an XY system of the robot accessor 18. The XY processor node 55 is coupled to the work processor node 52, and is responsive to the move commands, operating the XY system to position the gripper 20. An operator panel processor node 59 may be provided at the operator panel 23 for communicating between the operator panel and the other processor nodes.

A common bus 60 may be provided, allowing communication between the various processor nodes. The common bus may comprise a redundant wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Other similar bus networks, or a wireless network system, such as RF or infrared, may be employed in the library as is known to those of skill in the art.

Referring to FIG. 5, the communication processor node 50 is coupled to each of the data storage drives 15 of the base frame 11, via lines 70, communicating with the drives and with host systems 40, 41 and 42. Alternatively, the host systems may be directly coupled to the communication processor node 50 at input 80, 43, or to control port devices (not shown) which connect the library to the host system(s) with a library interface similar to the drive/library interface.

As is known to those of skill in the art, various communication arrangements may be employed for communication with the hosts and with the data storage drives. In the example of FIG. 5, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70.

An extension frame 12 may be provided, and may be coupled by an extension common bus 152 to the base frame common bus 60. Another communication processor node 155, similar to communication processor node 50, may be located in the extension frame and may communicate with hosts, e.g., at input 156, and data storage drives 15 in frame 12, e.g., via lines 170. Thus, commands from hosts may be received either directly, through a control port (not shown), or via the data storage drives, via an external interface. The communication processor node 155 is coupled to the extension common bus 152, the communication processor node 155 providing a communication link for the commands to the extension common bus 152, so that the commands are linked to the base frame common bus 60 and to the work processor node 52.

The communication processor node 155 may be mounted in the extension frame 12, closely adjacent to the coupled data storage drives 15 of the extension frame 12, communicating with the drives and with the attached host systems. The data storage drives 15 are also individually coupled to the communication processor node 155 by means of lines 170.

Additional extension frames with similar communication processor nodes 155, storage shelves 16, data storage drives 15, and extension busses 152, may be provided and each is coupled to the adjacent extension frame.

Further, the data storage library 10 may additionally comprise another robot accessor 28, for example, in a high availability frame 13. The robot accessor 28 may comprise a gripper 30 for accessing the data storage media, and an XY system 255 for moving the robot accessor. The high availability frame may be adjacent an extension frame 12, or adjacent the base frame 11, and the robot accessor 28 may run on the same horizontal mechanical path as robot accessor 18, or on an adjacent path. The exemplary control system additionally comprises an extension common bus 200 coupled to the extension common bus 152 of an extension frame or to the common bus 60 of the base frame. Another communication processor node 250 may be provided, which is also similar to communication processor node 50, 155, and may be located in the high availability frame 13, for receiving commands from hosts, either directly at input 256, or through control ports (not shown), or through the data storage drives 15 and lines 270, e.g., at input 256. The communication processor node 250 is coupled to the high availability frame extension common bus 200 and provides a communication link for the commands to the extension common bus.

The communication processor node 250 may be mounted closely adjacent to the coupled data storage drives 15 of the high availability frame 13, communicating with the drives and with the attached host systems. The data storage drives 15 are also individually coupled to the communication processor node 250 by means of lines 270, such as RS-422.

Also, an operator panel processor node 259 may be provided at an operator panel 280 for providing an interface for communicating between the operator panel and the communication processor nodes 50, 155 and 250, the work processor nodes 52 and 252, operator panel processor node 59, and the XY processor nodes 55 and 255.

Referring to FIGS. 1 and 5, a computer program implementing the calibration system of the present invention may be provided at one of the processor nodes, e.g., at work processor 52, or, optionally at processor 50, processor 155, or processor 250, or may be implemented in a plurality, or each, of the processor nodes, one or all of the processors comprising processor 100 of FIG. 1.

Figure 3:
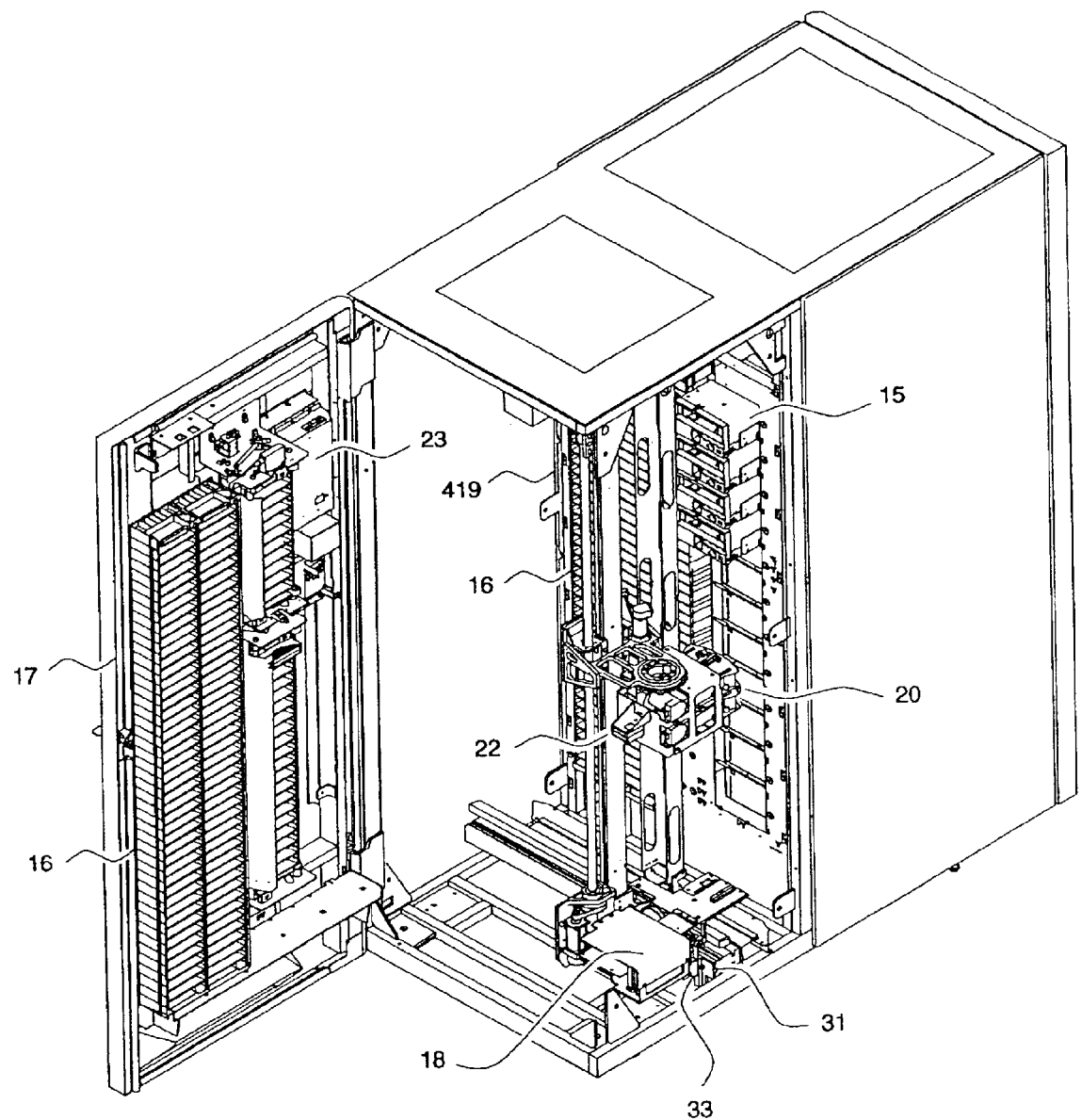
FIG. 3 is an isometric view of a frame of the automated data storage library of FIG. 2.
Figure 4:
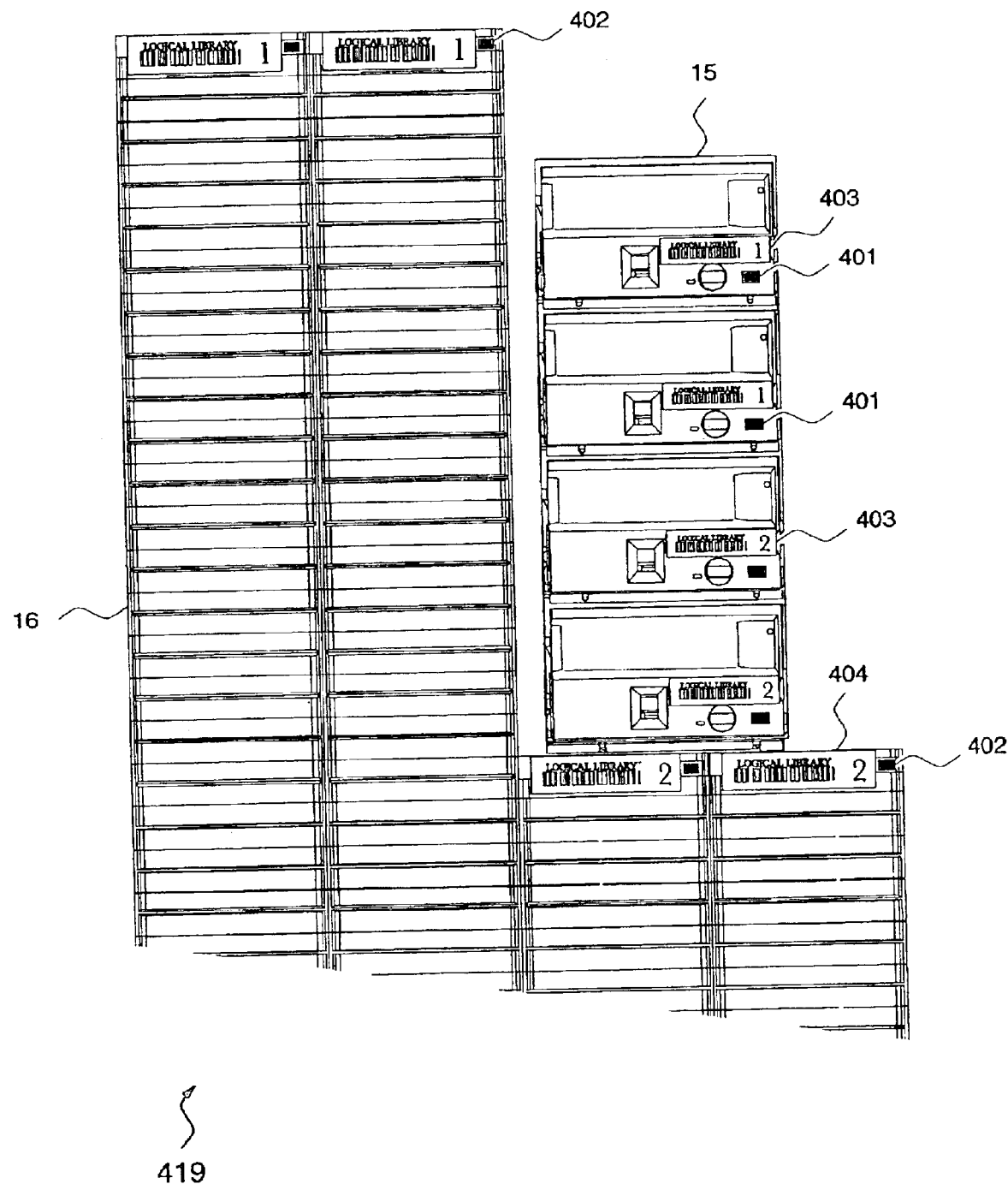
FIG. 4 is a frontal view of storage shelves and data storage drives of the automated data storage library of FIGS. 2 and 3, illustrating reference points and unique references in accordance with the present invention.

Referring to FIGS. 3, 4 and 5, positional accuracy is required so that the robot accessor, e.g. robot accessor 18, is able to access a desired storage shelf or a desired data storage drive, typically by direct "X" horizontal movement and "Y" vertical movement. The X and Y positioning are typically based on a reference or origin location. The "X" horizontal movement may also comprise a pivot or "Z" movement to access multiple sides of the library.

Often, a library may comprise one or more calibration points in the library, so that the robot accessor can go to the calibration point and precisely measure its location to establish the parameters, including the X and Y location, needed to accurately access part or all of the library.

FIG. 4 illustrates the top part of a rear wall 419 of a frame 11 of the automated data storage library of FIG. 3. The rear wall 419 comprises storage shelves 16 and data storage drives 15, and comprises reference points, such as reference points 401, for calibrating the data storage drives 15, and comprises reference points, such as reference points 402, for calibrating the storage shelves 16. Referring additionally to FIGS. 3 and 5, the reference points are to be detected by a sensor, such as the accessor sensor 22 of robot accessor 18, and/or the accessor sensor 32 of robot accessor 28.

Figure 2:
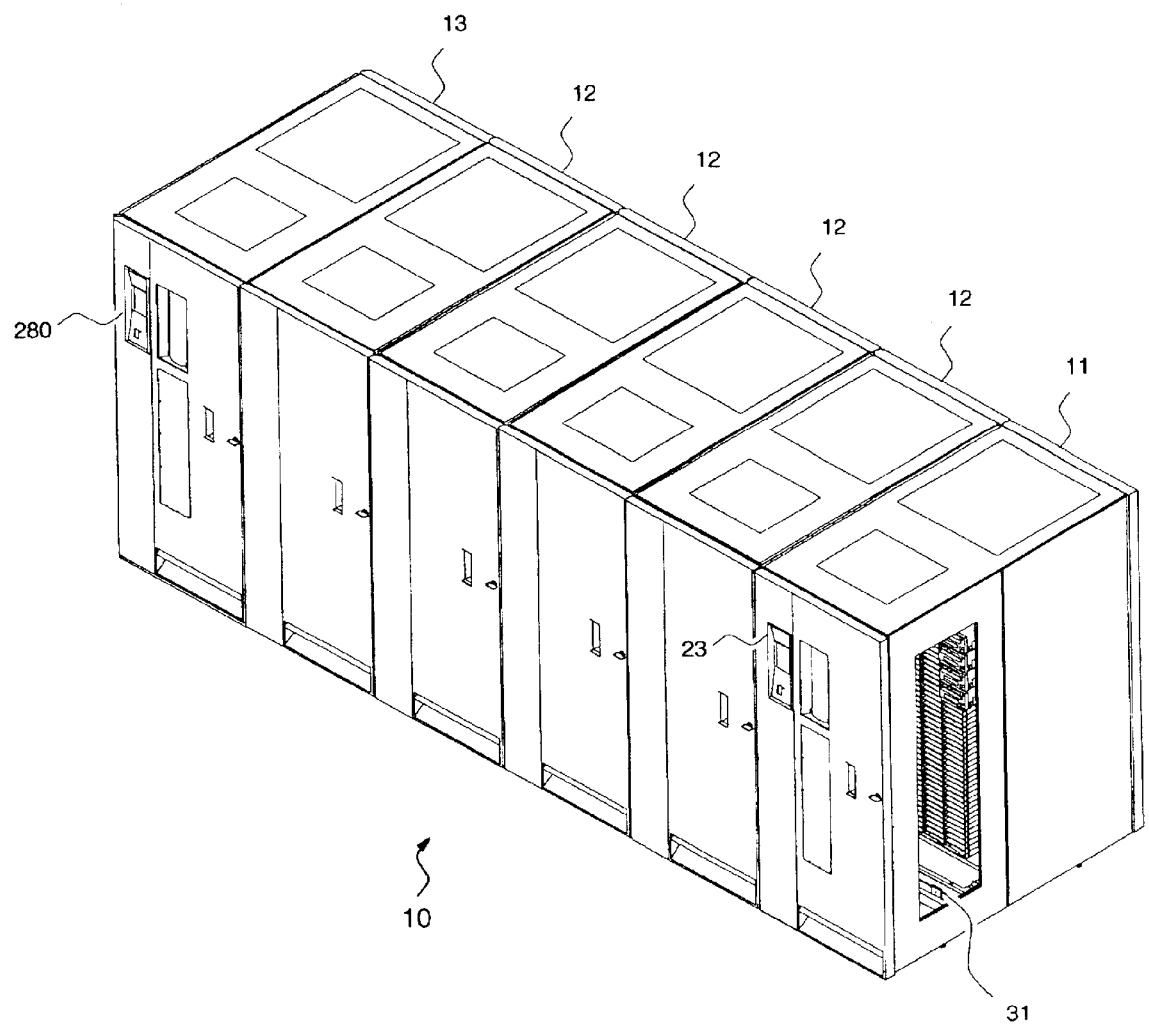
FIG. 2 is an isometric view of an automated data storage library in accordance with the present invention.

Additionally, references 403 of FIG. 4, such as bar code labels, are provided for identifying data storage drives 15, and references 404, such as bar code labels, are provided for identifying columns of storage shelves 16, or identifying a particular frame 11, or frame 12 or 13, in the automated data storage library of FIG. 2. Referring additionally to FIGS. 3 and 5, the references 403 or 404 are to be detected by the accessor sensor 22 of robot accessor 18, and/or the accessor sensor 32 of robot accessor 28.

The position of the robot accessor 18 may become uncertain or unknown, or develop an error through a number of means. One example is a library power off. The position of the robot accessor may not be monitored during the power off, and the robot accessor may have been moved. Another example is if a door of the library is opened and the robot accessor moved. Some other causes of positional errors may comprise belt or chain slippage or stretching, motor tachometer errors, control system errors, jumping a gear, a component may be moved or replaced, may become misaligned or wear, etc.

Hence, a common practice involves having a home position for the robot accessor which is used as the reference or origin location for other features in the library. The home position may comprise a special home station at a position of the library, for example, at one end of the rails on which the robot accessor is moved. In a loss of position by the robot accessor, a "rezero" operation is conducted by the calibration system in which the robot accessor is moved toward the home position reference location. Referring to FIGS. 2, 3 and 5, when the robot accessor 18 is at the home position, a home sensor 33 indicates the location of the robot accessor, which then becomes known, and calibration or other operations can then be conducted. The home sensor 33 may comprise an optical sensor that senses a flag 31 or protrusion from the robot accessor, a micro switch that is contacted and actuated by the robot accessor, etc. A similar home sensor 34 may be provided at another home position at the home station of the robot accessor 28, which may be at the opposite end of the rails, and in high availability frame 13. Alternatively, the library may use a crash stop as the home position, and there may not be a sensor per se. In this case, the library would detect that it has hit the crash stop and use this as an indicator that it has reached the home position.

If the position of the robot accessor 18, 28 is lost, such that the actual position is unknown with any certainty, and the robot accessor may be near a crash stop, etc., and it is desirable to avoid a collision, the robot accessor is typically moved at a slow speed toward the home position for the home position rezero operation.

As automated data storage libraries become larger, the potential distance between the home position and the robot accessor becomes longer, and this increases the time it takes to perform the home position rezero operation.

Figure 6A:
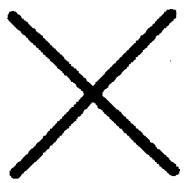
FIGS. 6A, 6B, 6C and 6D are representations of embodiments of reference points of FIG. 4.
Figure 6B:
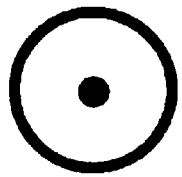
Figure 6C:
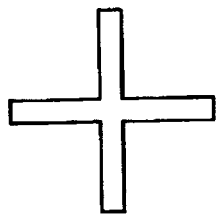
Figure 6D:
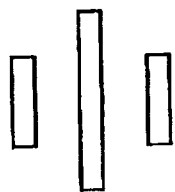

Referring to FIG. 4, the reference points 401 and 402 are depicted as rectangles, to be detected by the accessor sensor 22 of robot accessor 18 of FIGS. 3 and 5, and/or the accessor sensor 32 of robot accessor 28. Alternative examples of reference points comprise an "X" shape 407 of FIG. 6A, concentric circles 408 of FIG. 6B, a "plus" shape 409 of FIG. 6C, and parallel bars 410 of FIG. 6D. The reference points may be printed or painted, may be various colors, may be holes, openings, protrusions, etc. Many other examples may be envisioned by those of skill in the art.

The present invention is directed to potentially shortening rezero operations by potentially avoiding moving the robot accessor to the home position in every rezero operation or moves it home at a faster speed in some rezero operations.

Figure 7:
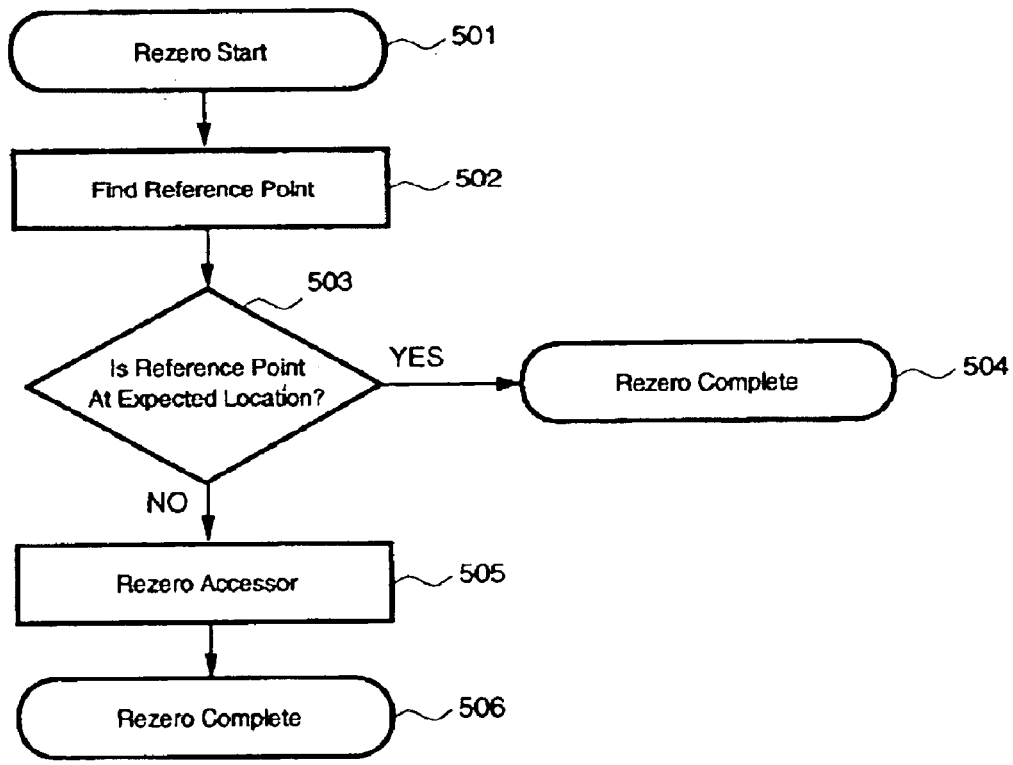
FIGS. 7, 8 and 9 are flow charts depicting embodiments of the method of the present invention for rezeroing a robot accessor of an automated data storage library in accordance with the present invention.

Referring to FIG. 7, in step 501, a rezero operation is begun by the calibration system. This may be initiated as part of an error recovery procedure (ERP), as part of a periodic rezero operation, as part of an initialization of the library, etc. Additionally referring to FIGS. 3, 4 and 5, in step 502, the processor conducting the rezero operation directs the robot accessor 18, 28 to find a specific reference point, such as one of the reference points 401, 402, at the coordinates of the reference point at an expected location, for example, as previously sensed by the accessor sensor 22, 32. The reference point may alternatively comprise any other calibration target or any other location that is known by the automated data storage library. An "expected location" may comprise a location that was previously sensed by the accessor sensor 22, 32, or may comprise a location that has been previously determined at development, manufacturing, configuration, calibration, etc. In step 503, a check is made to determine whether the actual location of the reference point was at the expected location. A reference point may not be at an expected location for a variety of reasons. For example, a belt may have slipped, a gear may have jumped a tooth, a component having the reference point may have been moved, etc. Step 503 may comprise various alternatives. If the reference point is, in one example, exactly at the expected location within the measurement capability of the accessor sensor 22, 32, or, in another example, at the expected location within a predetermined threshold per step

503, then control moves to step 504 where the rezero operation is considered to be complete. Since the reference point has not moved, it may be safe to assume that there is no need to actually perform the home position rezero operation, and considerable time may be saved as the result.

If, however, the reference point was not found at the expected location, or within the predetermined threshold, as indicated by step 503, control moves to step 505 to further continue to conduct the operation to rezero the robot accessor. Herein, "at substantially the expected location" comprises exactly at, or within a predetermined threshold. If the reference point was found, but not exactly at the expected location, or within the predetermined threshold, step 505 may comprise calculating the correct accessor location based on the offset of the same, or a different, reference point location. The difference between the actual location and the expected location may indicate the offset of the robot accessor. For example, if the actual location of a reference point 402 is 2 millimeters below and 1 millimeter to the right of the expected location for the reference point, then the processor would correct the accessor position by 2 millimeters in the vertical direction and 1 millimeter in the horizontal direction.

Alternatively, or if the reference point was not found, step 505 comprises operating the robot accessor perform the home position rezero operation, moving to the home position to rezero the calibration system with respect to the home position, for example, such that a home sensor 33, 34 verifies the location of the robot accessor. In either case, step 505 may update the robot accessor position if necessary. This may comprise storing offset values, updating a base position, etc. The updating or storing step may occur in memory, in a hardware register, etc. In step 506, the rezero operation is complete.

Figure 8:
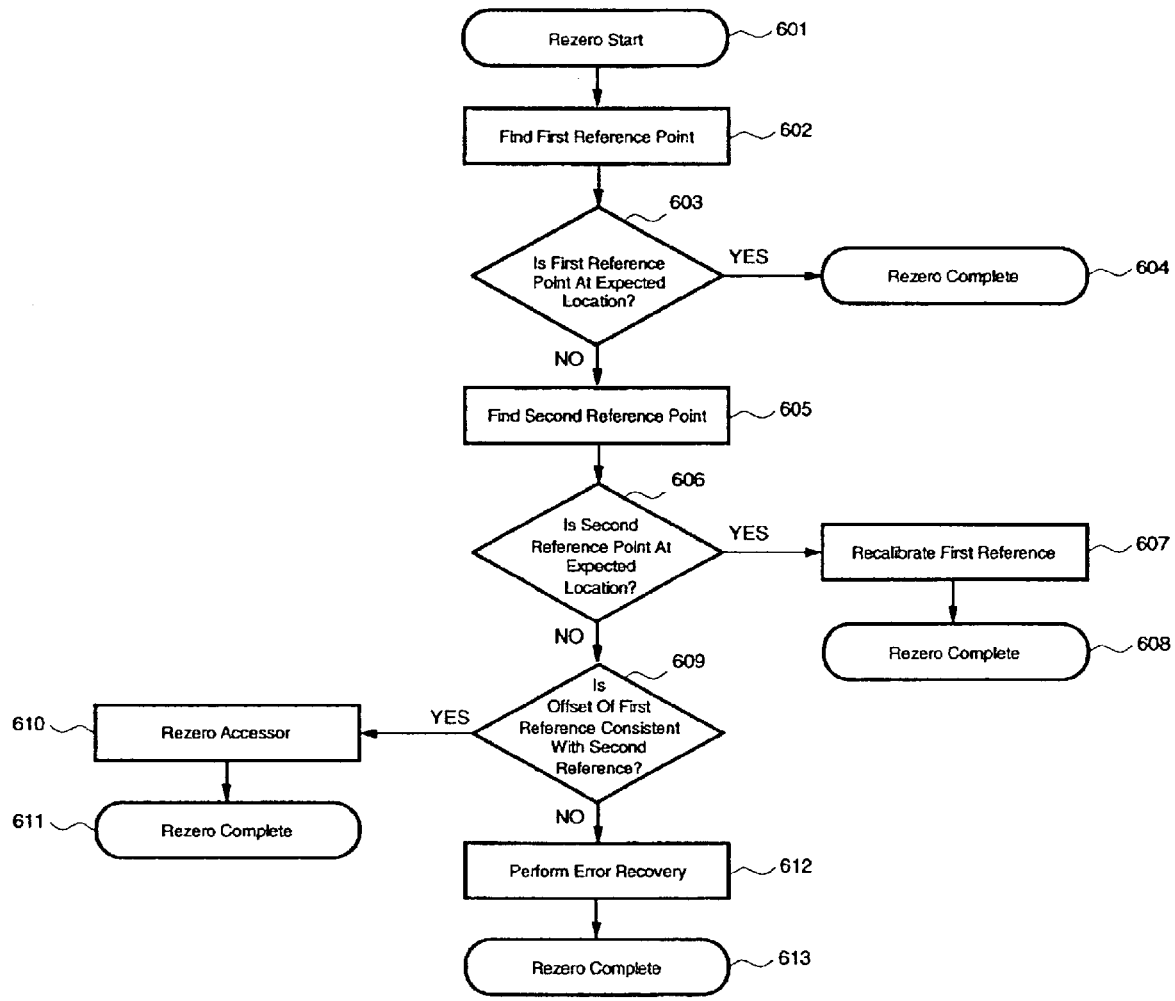

Referring to FIG. 8, in step 601, in another embodiment of the present invention, rezero operation begins, again, as part of an error recovery procedure (ERP), as part of a periodic rezero operation, as part of an initialization of the library, etc. Additionally referring to FIGS. 3, 4 and 5, in step 602, the processor conducting the rezero operation directs the robot accessor 18, 28 to find a first specific reference point, such as one of the reference points 401, 402, at the coordinates of the reference point, for example, as sensed by the accessor sensor 22, 32. As discussed above, the first reference point may alternatively comprise any other calibration target or any other location that is known by the automated data storage library. In step 603, a check is made to determine whether the actual location of the first reference point was at the expected location. Step 603, like step 503, may comprise various alternatives. If the reference point is, in one example, exactly at the expected location within the measurement capability of the accessor sensor 22, 32, or, in another example, at the expected location within a predetermined threshold per step 603, then control moves to step 604 where the rezero operation is considered to be complete. Since the reference point has not moved, it may be safe to assume that there is no need to actually perform the home position rezero operation, and considerable time may be saved as the result.

If, however, the first reference point was not found at the expected location, as indicated by step 603, control moves to step 605, where the processor directs the robot accessor 18, 28 to find a second reference point, such as another of the reference points 401, 402, at the coordinates of the reference point, for example, as sensed by the accessor sensor 22, 32. The reference point may alternatively comprise any other calibration target or any other location that is known by the automated data storage library. In step 606, a check is made to determine whether the actual location of the second reference point was at the expected location. Step 606 may also comprise various alternatives, in one example, whether the reference point is exactly at the expected location within the measurement capability of the accessor sensor 22, 32, or, in another example, at the expected location within a predetermined threshold. If the reference point is at the expected location per step 606, then control moves to step 607 where a recalibration of the first reference point is conducted. Since the second reference point has not moved, it may be safe to assume that there is a problem with the first reference point, and not with the robot accessor. This is because a change in the robot accessor would have resulted in a change to both reference point locations. The rezero operation may be considered complete in step 608, and there is no need to actually perform the home position rezero operation, and considerable time may be saved as the result.

If, however, the second reference point was not found at the expected location, as indicated by step 606, control moves to step 609, where the processor determines whether the offset of the first reference point, if known, is consistent with that of the second reference point, which may indicate that the robot accessor is offset. For example, the robot accessor 18, 28 may experience a 2 millimeter vertical position offset and a 1 millimeter horizontal position offset. When comparing the actual position of the of the first reference point to the expected position of the first reference point, the accessor would detect an opposite position offset of the first reference point. A similar opposite position offset would be detected for the position of the second reference point. If the offset of the first reference point is similar to the offset of the second reference point, as indicated in step 609, then control moves to step 610 to rezero the robot accessor, for example, comprising calculating the correct accessor location based on either offset, or some combination of both offsets, such as an average. Step 610 may comprise storing offset values, updating a base position, etc. Alternatively, step 610 may comprise a home position rezero operation. The updating or storing step may occur in memory, in a hardware register, etc. In step 611, the rezero operation is complete.

If, alternatively, step 609 indicates that the offsets of the first and the second reference points are not consistent, or one of the reference points was not found, then an error recovery operation may be performed in step 612. For example, multiple position problems may be involved, and still other reference point locations may be checked, and/or a home position rezero operation may be conducted. In addition, the processor may initiate a calibration of some or all of the reference points. Control then moves to step 613 where the rezero operation is complete.

Figure 9:
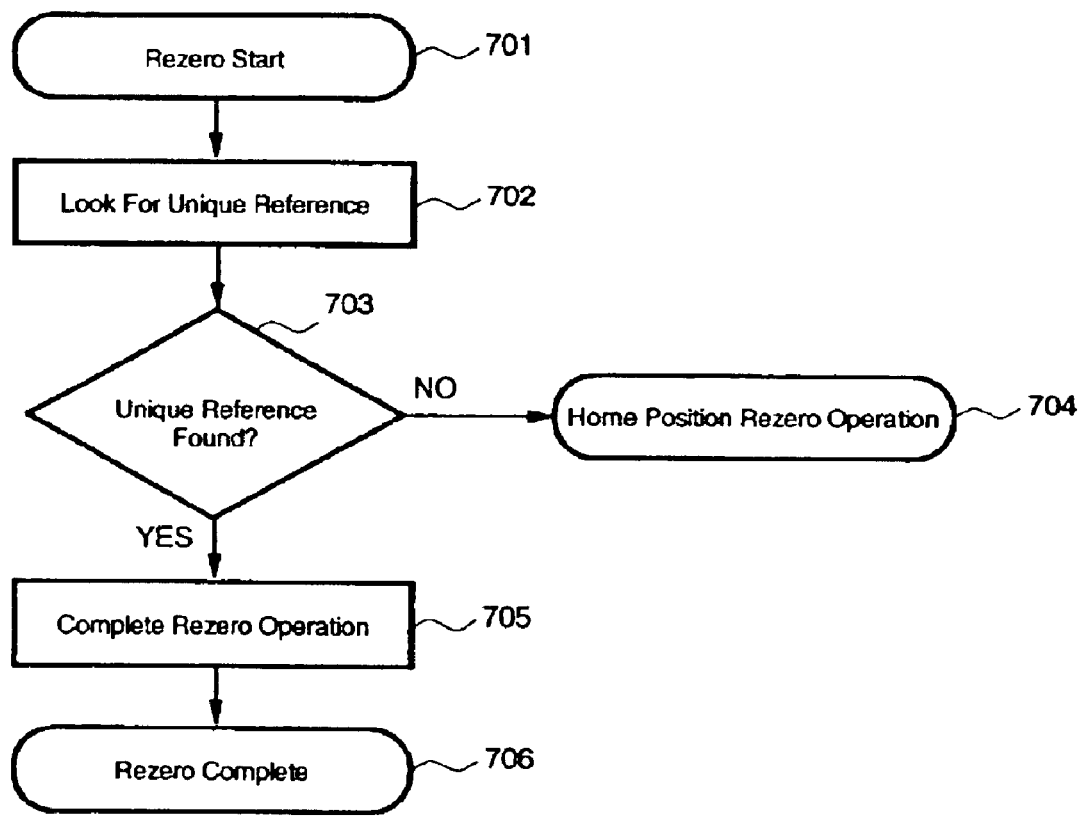

Referring to FIG. 9, in step 701, a rezero operation is begun in accordance with a further embodiment of the present invention. The rezero operation may be initiated as part of an error recovery procedure (ERP), as part of a periodic rezero operation, as part of an initialization of the library, etc. Additionally referring to FIGS. 3, 4 and 5, in step 702, the processor conducting the rezero operation directs the robot accessor 18, 28 to look for an unique reference, such as one of the references 403 of FIG. 4, such as bar code labels, that are provided for identifying data storage drives 15, and references 404, such as bar code labels, that are provided for identifying columns of storage shelves 16, or identifying a particular frame 11, or frame 12 or 13, in the automated data storage library of FIG. 2. The reference may be unique in that it has characteristics that are different than one or more reference points. In the case where the reference is a bar code label, it may comprise a unique label that allows the processor to determine the frame number, column number, or drive number within the library and to determine a point of reference. Alternatively, the reference may be offset from the typical reference point 401, 402, and the unique offset may help to determine an unique location within the frame or library. Herein, "unique reference" comprises a reference that has unique characteristics such that a general location within the library can be determined by sensing the reference.

In one example, the processor conducting the rezero operation looks for the unique reference when the position of the robot accessor is uncertain or unknown. The Y, or vertical position, of the accessor sensor 22, 32 is set to the likely height of the unique reference, and the robot accessor 18, 28 is moved slowly toward the home position. While the accessor is being moved, the unique reference may be sensed by an accessor sensor, such as the accessor sensor 22, 32. The robot accessor sensor used to sense the unique reference may be a different type of sensor than that used to sense a reference point. For example the unique reference may be sensed by a bar code reader having poor positional resolution, and the reference point sensed by a precision sensor. In step 703, a check is made to determine whether the unique reference was sensed by the accessor sensor. Without a point of reference, the robot accessor is running blind. If, in step 703, the unique reference is not found, the processor is running blind and continues to move the robot accessor to the home position at low speed, so as to not damage the accessor, or home sensor 33, 34, or the library in the event of a collision with an end stop or flag 31. The processor may then rezero the calibration system with respect to the home position in step 704.

If, however, the unique reference is found, as indicated in step 703, control moves to step 705 to determine the unique location of the unique reference, for example, from a table, and to complete the rezero operation. The rezero operation may comprise moving the accessor to the home position to rezero the calibration system, but since the location of the robot accessor is generally known because of the determination of the unique location, the home position rezero operation may be conducted at a high speed and a higher performance operation is possible. Herein, "high speed" refers to a speed faster than possible when the processor is running blind.

Alternatively, the rezero operation may comprise the above rezero operation, employing the determined unique location of the unique reference to then use a location of a reference point to determine the position of the robot accessor. The reference point may comprise the unique reference itself, if it comprises a degree of precision, such as a reference point on the same label. In some cases, the accuracy of the unique reference may be too coarse for setting the accessor position. For example, unique reference 404 of FIG. 4 comprises a bar code label. Bar code scanners alone tend to have a wide area of margin for reading labels, and this could cause excessive positional error. Therefore, a more precise reference point, such as reference point 402 next to label 404, is checked. The reference point typically requires a more precise sensor than that used to sense the unique reference. Hence, herein, "robot accessor sensor" 22, 32 may comprise one or a plurality of sensors having various levels of location measurement precision. Thus, step 705 may comprise calculating the correct accessor location based on the reference point location, as discussed above with respect to step 505. Any difference between the actual location and the expected location of the reference point may indicate the offset of the robot accessor. For example, if the actual location of a reference point 402 is 2 millimeters below and 1 millimeter to the right of the expected location for the reference point, then the processor would correct the accessor position by 2 millimeters in the vertical direction and 1 millimeter in the horizontal direction.

If the reference point could not be found, step 705 comprises operating the robot accessor to perform the home position rezero operation, moving to the home position, for example, such that a home sensor 33, 34 verifies the location of the robot accessor. In either case, step 705 may update the robot accessor position if necessary. This may comprise storing offset values, updating a base position, etc. The updating or storing step may occur in memory, in a hardware register, etc. In step 706, the rezero operation is complete.

The illustrated components of the rezero system and processor(s), and of the automated data storage library may be varied, combined, or combined functions may be separated, as is known to those of skill in the art. The illustrated steps of FIGS. 7, 8 and 9 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A system for determining positioning in an automated data storage library, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said system comprising:

at least one reference point located at an expected location in said automated data storage library remote from said robot accessor home position; and at least one processor for operating said at least one robot accessor in accordance with a calibration system, said at least one processor, conducting a rezero operation, moves said robot accessor sensor to said expected location of said at least one reference point; and if said one reference point is sensed by said robot accessor sensor at substantially said expected location, said rezero operation is completed;

wherein said at least one processor, during said rezero operation, if said one reference point is sensed by said robot accessor;

compares said sensed location of said one reference point to said expected location; if said comparison indicates an offset between said sensed location and said expected location of said one reference point, moves said robot accessor to a second expected location of a second reference point; and if said second reference point is sensed by said robot accessor sensor at substantially said second expected location, updates said calibration system with respect to said one reference point, and said rezero operation is completed.

2. A system for determining positioning in an automated data storage library, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said system comprising:

at least one reference point located at an expected location in said automated data storage library remote from said robot accessor home position; and at least one processor for operating said at least one robot accessor in accordance with a calibration system, said at least one processor, conducting a rezero operation, moves said robot accessor sensor to said expected location of said at least one reference point; and if said one reference point is sensed by said robot accessor sensor at substantially said expected location, said rezero operation is completed;

wherein said at least one processor, during said rezero operation, if said one reference point is sensed by said robot accessor sensor;

compares said sensed location of said one reference point to said expected location of said one reference point;

if said comparison indicates an offset between said sensed location and said expected location of said one reference point moves, said robot accessor to a second expected location of a second reference point;

if said second reference point is sensed by said robot accessor sensor, but is offset from said second expected position;

determines whether said offset of said second reference point is consistent with said offset of said one reference point; and if said offsets are consistent, updates said calibration system with respect to said one reference point and/or said second reference point, and said rezero operation is completed.

3. A system for determining positioning in an automated data storage library, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said system comprising:

at least one unique reference at an unique location in said automated data storage library; and at least one processor for operating said at least one robot accessor in accordance with a calibration system, said at least one processor, conducting a rezero operation, moves said robot accessor sensor toward said unique location of paid unique reference and/or said home position; and if said unique reference is sensed by said at least one robot accessor sensor, determines said unique location and completes said rezero operation;

wherein said at least one processor, during said rezero operation, if said unique reference is found, moves said robot accessor to said home position at high speed.

4. An automated data storage library, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive; said robot accessor having at least one sensor;

at least one home position for said at least one robot accessor;

at least one reference point located at an expected location in said automated data storage library remote from said robot accessor home position; and at least one processor for operating said at least one robot accessor in accordance with a calibration system, said at least one processor, conducting a rezero operation, moves said robot accessor sensor to said expected location of said at least one reference point; and if said one reference point is sensed by said robot accessor sensor at substantially said expected location, said rezero operation is completed;

wherein said at least one processor, during said rezero operation, if said one reference point is sensed by said robot accessor;

compares said sensed location of said one reference point to said expected location; if said comparison indicates an offset between said sensed location and said expected location of said one reference point, moves said robot accessor to a second expected location of a second reference point; and if said second reference point is sensed by said robot accessor sensor at substantially said second expected location, updates said calibration system with respect to said one reference point, and said rezero operation is completed.

5. An automated data storage library, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive; said robot accessor having at least one sensor;

at least one home position for said at least one robot accessor;

at least one reference point located at an expected location in said automated data storage library remote from said robot accessor home position; and at least one processor for operating said at least one robot accessor in accordance with a calibration system, said at least one processor, conducting a rezero operation, moves said robot accessor sensor to said expected location of said at least one reference point; and if said one reference point is sensed by said robot accessor sensor at substantially said expected location, said rezero operation is completed;

wherein said at least one processor, during said rezero operation, if said one reference point is sensed by said robot accessor sensor;

compares said sensed location of said one reference point to said expected location of said one reference point;

if said comparison indicates an offset between said sensed location and said expected location of said one reference point, moves said robot accessor to a second expected location of a second reference point;

if said second reference point is sensed by said robot accessor sensor, but is offset from said second expected position;

determines whether said offset of said second reference point is consistent with said offset of said one reference point; and if said offsets are consistent, updates said calibration system with respect to said one reference point and/or said second reference point, and said rezero operation is completed.

6. An automated data storage library, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive; said robot accessor having at least one sensor;

at least one home position for said at least one robot accessor;

at least one unique reference at an unique location in said automated data storage library: and at least one processor for operating said at least one robot accessor in accordance with a calibration system, said at least one processor, conducting a rezero operation, moves said robot accessor sensor toward said unique location of said unique reference and/or said home position; and if said unique reference is sensed by said at least one robot accessor sensor, determines said unique location and completes said rezero operation;

wherein said at least one processor, during said rezero operation, if said unique reference is found, moves said robot accessor to said home position at high speed.

7. A method for determining positioning in an automated data storage library, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said automated data storage library additionally comprising at least one reference point located at an expected location in said automated data storage library remote from said robot accessor home position; said method comprising the steps of;

conducting a rezero operation in accordance with a calibration system, comprising:

moving said robot accessor sensor to said expected location of said at least one reference point; and if said one reference point is sensed by said robot accessor sensor at substantially said expected location, said rezero operation is completed;

additionally comprising, during said rezero operation;

if said one reference point is sensed by said robot accessor, comparing said sensed location of said one reference point to said expected location;

if said comparison indicates an offset between said sensed location and said expected location of said one reference point, moving said robot accessor to a second expected location of a second reference point; and if said second reference point is sensed by said robot accessor sensor at substantially said second expected location, updating said calibration system with respect to said one reference point, and said rezero operation is completed.

8. A method for determining positioning in an automated data storage library, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said automated data storage library additionally comprising at least one reference point located at an expected location in said automated data storage library remote from said robot accessor home position; said method comprising the steps of:

conducting a rezero operation in accordance with a calibration system, comprising:

moving said robot accessor sensor to said expected location of said at least one reference point; and if said one reference point is sensed by said robot accessor sensor at substantially said expected location, said rezero operation is completed;

additionally comprising, during said rezero operation:

if said one reference point is sensed, comparing said sensed location of said one reference point to said expected location of said one reference point;

if said comparison indicates an offset between said sensed location and said expected location of said one reference point, moving said robot accessor to a second expected location of a second reference point, if said second reference point is sensed but is offset from said second expected position, determining whether said offset of said second reference point is consistent with said offset of said one reference point; and if said offsets are consistent, updating said calibration system with respect to said one reference point and/or said second reference point, and completing said rezero operation.

9. A method for determining positioning in an automated data storage library, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said automated data storage library additionally comprising at least one unique reference at an unique location in said automated data storage library; said method comprising the steps of:

conducting a rezero operation in accordance with a calibration system, comprising:

moving said robot accessor sensor toward said unique location of said unique reference and/or said home position; and if said unique reference is sensed by said robot accessor sensor, determining said unique location and completing said rezero operation;

additionally comprising, during said rezero operation:

if said unique reference is found, said step of completing said rezero operation comprises moving said robot accessor to said home position at high speed.

10. A computer program product usable with at least one programmable computer processor having computer readable code embodied therein, said at least one programmable computer processor for operating said at least one robot accessor of an automated data storage library in accordance with a calibration system to conduct a rezero operation, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said automated data storage library additionally comprising at least one reference point located at an expected location in said automated data storage library remote from said robot accessor home position; said computer program product comprising:

computer readable program code causing said at least one programmable computer processor to move said robot accessor sensor to said expected location of said at least one reference point;

computer readable program code causing said at least one programmable computer processor to, if said one reference point is sensed by said robot accessor sensor at substantially said expected location, said rezero operation is completed;

computer readable program code causing said at least one programmable computer processor to, if said one reference point is sensed by said robot accessor, compare said sensed location of said one reference point to said expected location;

computer readable program code causing said at least one programmable computer processor to, if said comparison indicates an offset between said sensed location and said expected location of said one reference point, move said robot accessor to a second expected location of a second reference point; and computer readable program code causing said at least one programmable computer processor to, if said second reference point is sensed by said robot accessor sensor at substantially said second expected location, update said calibration system with respect to said one reference point, and said rezero operation is completed.

11. A computer program product usable with at least one programmable computer processor having computer readable code embodied therein, said at least one programmable computer processor for operating said at least one robot accessor of an automated data storage library in accordance with a calibration system to conduct a rezero operation, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said automated data storage library additionally comprising at least one reference point located at an expected location in said automated data storage library remote from said robot accessor home position; said computer program product comprising:

computer readable program code causing said at least one programmable computer processor to move said robot accessor sensor to said expected location of said at least one reference point;

computer readable program code causing said at least one programmable computer processor to, if said one reference point is sensed by said robot accessor sensor at substantially said expected location, said rezero operation is completed;

computer readable program code causing said at least one programmable computer processor to, if said one reference point is sensed, compare said sensed location of said one reference point to said expected location of said one reference point;

computer readable program code causing said at least one programmable computer processor to, if said comparison indicates an offset between said sensed location and said expected location of said one reference point, move said robot accessor to a second expected location of a second reference point;

computer readable program code causing said at least one programmable computer processor to detect if said second reference point is offset from said second expected location;

computer readable program code causing said at least one programmable computer processor to, if said second reference point is offset from said second expected position, determine whether said offset of said second reference point is consistent with said offset of said one reference point; and computer readable program code causing said at least one programmable computer processor to, if said offsets are consistent, update said calibration system with respect to said one reference point and/or said second reference point, and complete said rezero operation.

12. A computer program product usable with at least one programmable computer processor having computer readable code embodied therein, said at least one programmable computer processor for operating said at least one robot accessor of an automated data storage library in accordance with a calibration system to conduct a rezero operation, said automated data storage library having a plurality of storage shelves for storing data storage media; at least one data storage drive for reading and/or writing data with respect to said data storage media; and at least one robot accessor for transporting said data storage media between said plurality of storage shelves and said at least one data storage drive; said robot accessor having at least one sensor, and said automated data storage library having at least one home position for said at least one robot accessor; said automated data storage library additionally comprising at least one unique reference at an unique location in said automated data storage library; said computer program product comprising:

computer readable program code causing said at least one programmable computer processor to move said robot accessor sensor toward said unique location of said unique reference and/or said home position;

computer readable program code causing said at least one programmable computer processor to, if said unique reference is sensed by said robot accessor sensor, determine said unique location and complete said rezero operation; and computer readable program code causing said at least one programmable computer processor to, if said unique reference is found, move said robot accessor to said home position at high speed.

* * * * *